United States Patent
Cipriani

(10) Patent No.: US 11,121,612 B2
(45) Date of Patent: Sep. 14, 2021

(54) ROTARY-LINEAR ACTUATION ASSEMBLY

(71) Applicant: AROL S.P.A., Canelli (IT)

(72) Inventor: Marco Cipriani, Alpignano (IT)

(73) Assignee: AROL S.P.A., Canelli (IT)

( * ) Notice: Subject to any disclaimer, the term of this patent is extended or adjusted under 35 U.S.C. 154(b) by 80 days.

(21) Appl. No.: 16/493,530

(22) PCT Filed: Mar. 14, 2018

(86) PCT No.: PCT/IB2018/051689
§ 371 (c)(1),
(2) Date: Sep. 12, 2019

(87) PCT Pub. No.: WO2018/167678
PCT Pub. Date: Sep. 20, 2018

(65) Prior Publication Data
US 2020/0007015 A1 Jan. 2, 2020

(30) Foreign Application Priority Data

Mar. 14, 2017 (IT) .................. 102017000028120

(51) Int. Cl.
*H02K 16/00* (2006.01)
*H02K 11/22* (2016.01)
(Continued)

(52) U.S. Cl.
CPC ............. *H02K 16/00* (2013.01); *H02K 11/22* (2016.01); *H02K 21/14* (2013.01); *H02K 41/02* (2013.01); *H02K 2201/18* (2013.01)

(58) Field of Classification Search
CPC ........ H02K 11/22; H02K 16/00; H02K 21/12; H02K 21/14; H02K 41/02; H02K 2201/18
(Continued)

(56) References Cited

U.S. PATENT DOCUMENTS 5,491,633 A * 2/1996 Henry ................ B60G 17/0157
324/207.21
6,362,547 B1 3/2002 Peterson et al.
(Continued)

FOREIGN PATENT DOCUMENTS

DE 2906404 A1 8/1980
DE 10163626 A1 7/2003
(Continued)

*Primary Examiner* — Tulsidas C Patel
*Assistant Examiner* — Rashad H Johnson
(74) *Attorney, Agent, or Firm* — Howson & Howson LLP

(57) ABSTRACT

A rotary-linear actuation assembly comprising a casing internally housing an output shaft arranged coaxial with an actuation axis (A) in a translationally and rotationally movable manner, at least two actuators, of which a first actuator is adapted to impose a translational movement along the actuation axis (A) on the output shaft and a second actuator is adapted to impose a rotary movement about the actuation axis (A) on the output shaft, and at least one position sensor adapted to detect an instant position of the output shaft inside the casing. At least one position sensor is mounted in fixed manner in respect of rotation about the actuation axis (A) and in fixed manner in respect of translation along the actuation axis (A) and faces at least a portion of the output shaft.

13 Claims, 4 Drawing Sheets

(51) Int. Cl.
*H02K 21/14* (2006.01)
*H02K 41/02* (2006.01)

(58) Field of Classification Search
USPC ........ 310/10, 12.24, 15, 25, 68 B, 68 D, 118
See application file for complete search history.

(56) References Cited

U.S. PATENT DOCUMENTS

| | | | |
|---|---|---|---|
| 2011/0193425 A1 | 8/2011 | Hiura et al. | |
| 2016/0294252 A1* | 10/2016 | Whiteley | ................ H02K 7/06 |
| 2017/0292855 A1* | 10/2017 | Kaste | ..................... G01D 5/142 |
| 2019/0086238 A1* | 3/2019 | Moriyama | ............ F16C 41/007 |

FOREIGN PATENT DOCUMENTS

| | | | | |
|---|---|---|---|---|
| DE | 10261796 A1 | 7/2004 | | |
| DE | 102005061028 A1 | 3/2007 | | |
| EP | 2163851 A1 | 3/2010 | | |
| JP | S52-046413 A | 4/1977 | | |
| JP | 2003-319635 A | 11/2003 | | |
| WO | 01/22038 A1 | 3/2001 | | |
| WO | WO-2016043710 A1 * | 3/2016 | ............ | G01D 5/202 |

* cited by examiner

FIG. 4
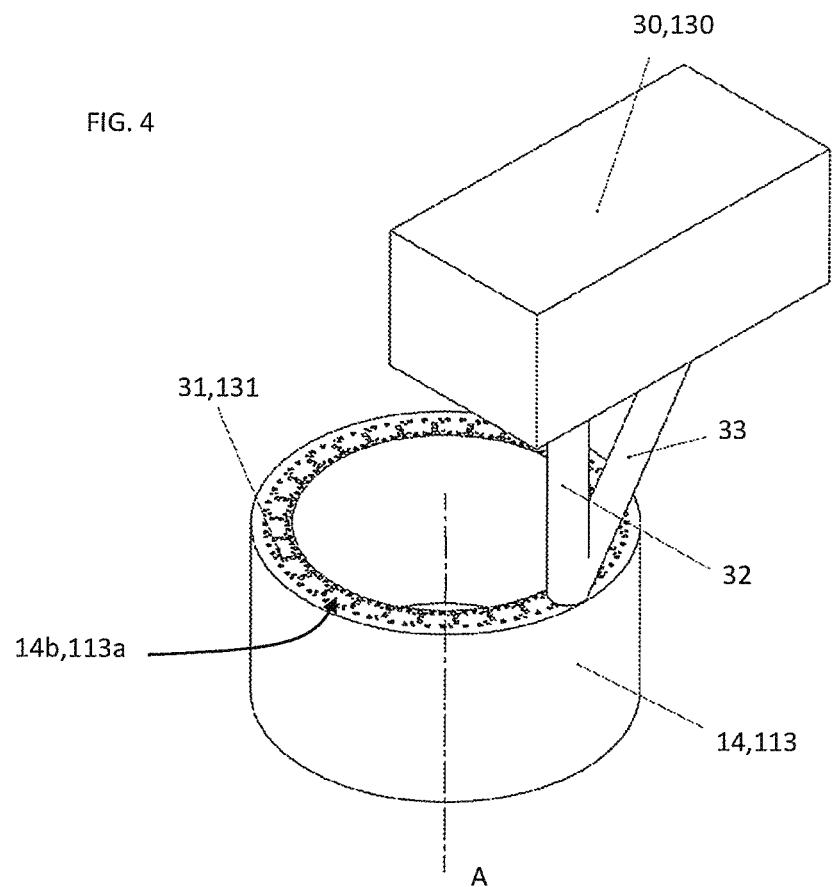
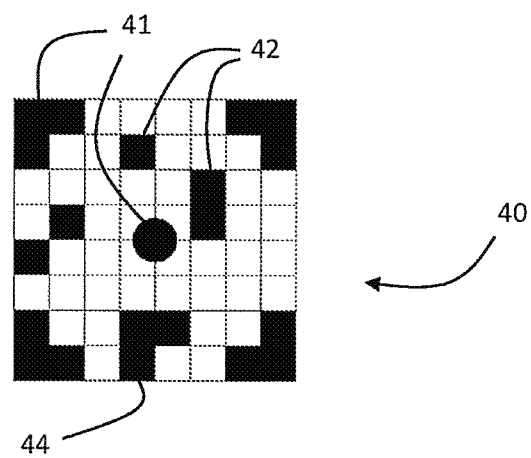
FIG. 4a

ROTARY-LINEAR ACTUATION ASSEMBLY

The present invention concerns an improved rotary-linear actuation assembly, more particularly a rotary-linear actuation assembly with high operating precision and increased reliability.

Rotary-linear actuators are currently used in several industrial applications requiring that a same actuator output shaft be capable of imparting in independent manner, either simultaneously or sequentially, both a rotary movement and a linear movement.

In order to precisely and reliably control the motion of the output shaft of such an actuator, it is necessary to be capable of detecting in real time both the instant angular position and the instant longitudinal position taken by the shaft.

Thus, in prior art actuation assemblies, a plurality of sensors are currently used, which are each devoted to detect a specific spatial coordinate taken by the output shaft, in order to obtain the instant position of the same shaft based on which the control of the motor(s) acting on the shaft is to be set.

For instance, in order to detect the angular coordinate of the output shaft, it is known to use an optical or magnetic rotary sensor or, in the alternative, an encoder, an inductive sensor (resolver), a potentiometer or a Hall effect sensor. As to the detection of the axial coordinate of the output shaft, an optical ruler, an optical encoder or an inductive transducer (Inductosyn) are usually employed.

The Applicant has realised that the sensors currently used in rotary-linear actuation assemblies require, for their correct operation, that the movement of the output shaft be at least partly followed. This entails the need for specific movable supports, such as for instance a rotary support following the shaft rotation and carrying the linear position sensor, as well as a support which allows translation of the rotary sensor together with the shaft and on which the sensor is keyed.

Moreover, the Applicant has noticed that mounting the sensors on the proper supports entails not only problems of alignment on the axes, but also the use of translating and rotating fastening means based on bushings and bearings, which determine in any case sliding and/or rolling contacts. This not only increases the number of elements that can be subjected to wear in the actuation assembly, but may also give rise in time to lack of precision in the movement alignment of the sensors with the shaft and hence to lack of precision in the detection, thereby requiring a constant maintenance in order to ensure in time a proper sensor operation and hence a good measurement precision.

The problem upon which the present invention is based is thus to provide a rotary-linear actuation assembly which is capable of overcoming the limits of the state of the art in simple, reliable and cheap manner.

Within such a problem, it is an object of the present invention to conceive a rotary-linear actuation assembly equipped with a displacement sensor which is capable of correctly detecting both the angular displacement and the linear displacement of an element movable according to a roto-translational movement, without using movable supports following at least partly the roto-translational movement of the movable element.

More particularly, it is a further object of the present invention to provide a rotary-linear actuation assembly which is capable of ensuring a high operation precision and of maintaining such a precision in reliable manner in time, while demanding a minimum engagement in terms of maintenance and setting.

In accordance with a first aspect thereof, the present invention therefore concerns a rotary-linear actuation assembly comprising a casing internally housing:
  an output shaft arranged coaxial with an actuation axis in a translationally and rotationally movable manner;
  at least two actuators, of which a first actuator is adapted to impose a translational movement along the actuation axis on the output shaft and a second actuator is adapted to impose a rotary movement about the actuation axis on the output shaft; and
  at least one position sensor adapted to detect an instant position of the output shaft inside the casing;
and is characterised in that the at least one position sensor is mounted in fixed manner in respect of rotation about the actuation axis and in fixed manner in respect of translation along the actuation axis, and faces at least a portion of the output shaft.

Advantageously, in this manner, equipping the actuation assembly with movable supports and the associated transmission members, such as for instance splined members or recirculating rolling screws, is no longer necessary, thereby reducing the overall complexity of the assembly as well as the need for maintenance thereof.

The present invention may have at least one of the following preferred features, which in particular can be combined together at will in order to cope with specific application requirements.

Preferably, the at least a portion of the output shaft bears, on the jacket surface thereof, a mark extending over at least an angular portion around the output shaft and/or over at least an axial section along the axial extension of the output shaft.

Advantageously, it is thus possible to have the information about the instant position of the output shaft directly on the surface thereof, thus enabling working with a single sensor, which moreover is stationary as far as the displacements of the output shaft are concerned.

More preferably, the mark extends substantially all around the output shaft.

More preferably, the mark axially extends along the output shaft over at least a length substantially corresponding to a maximum stroke travelled by the output shaft under the action imparted by the first actuator.

More preferably, the mark comprises a plurality of variable markers along the angular and/or axial extension of the output shaft portion bearing the mark.

Conveniently, it is thus possible to have available two-dimensional information about the instant position of the shaft, which information can be detected by the stationary sensor. It is thus possible to simultaneously detect both the instant axial position and the instant angular position of the shaft by means of a single stationary sensor.

Even more preferably, the markers comprise a plurality of subareas of the surface of the output shaft portion having respectively different opacity degrees.

Preferably, the mark is divided into a plurality of areas each comprising a set of subareas forming the markers relevant to a given angular and axial position.

More preferably, the areas into which the mark is divided are polygonal, preferably square, hexagonal or octagonal.

Further preferably, the position sensor comprises at least one light source, preferably a laser light source, and at least one photodetector, preferably a CCD or a CMOS.

In the alternative, the markers comprise a plurality of magnetic tracks formed on the surface of the output shaft portion and the position sensor comprises an array of magnetic sensors.

Preferably, the first and the second actuator are arranged in a mutually coaxial and concentric manner, the mark being formed on at least a portion of a jacket surface of a magnetic rotor mounted on an outer jacket surface of the output shaft and associated with a radially outermost actuator out of the first and the second actuator.

In the present description and in the claims that follow, the term "magnetic rotor" denotes both a rotor of a kind with permanent magnets and a ferromagnetic rotor having a configuration suitable to transfer a rotation torque.

Preferably, the jacket surface of the at least a portion of the output shaft is coated with a coating film, the mark being formed on such a coating film.

Preferably, the position sensor is fixedly mounted in an axial position in close proximity of an electromagnetic stator associated with a radially outermost actuator out of the first and the second actuator.

More preferably, the radially outermost actuator is the second actuator adapted to impose a rotary movement about the actuation axis on the output shaft.

In the alternative, the radially outermost actuator is the first actuator adapted to impose a translational displacement along the actuation axis on the output shaft.

Preferably, the first and the second actuator are arranged axially side by side and are mutually connected by at least one rotation-decoupling joint, the output shaft carrying a magnetic rotor associated with the second actuator.

More preferably, the position sensor is fixedly mounted in an axial position in close proximity of an electromagnetic stator associated with the second actuator.

Further features and advantages of the present invention will become more apparent from the following detailed description of some preferred embodiments thereof, made with reference to the accompanying drawings.

The different features in the individual configurations can be combined together at will according the preceding description, should the advantages specifically resulting from a particular combination have to be exploited.

In the drawings:

FIGS. 4 and 4a are schematic representations of a second position sensor employed in a rotary-linear actuation assembly according to the present invention and of an exemplary mark to be used with such a second position sensor, respectively.

In the following description, for explaining the Figures, the same reference numerals are used to denote constructive elements having the same functions. Moreover, for the sake of clarity of the illustration, it is possible that some reference numerals are not shown in all Figures.

Indications such as "vertical" and "horizontal", "upper" and "lower" (in the absence of further indications) are to be intended with reference to the mounting (or operating) conditions and with reference to the normal terminology in use in the current language, where "vertical" denotes a direction substantially parallel to the direction of the vector force of gravity "g" and "horizontal" denotes a direction perpendicular thereto.

Figure 1:
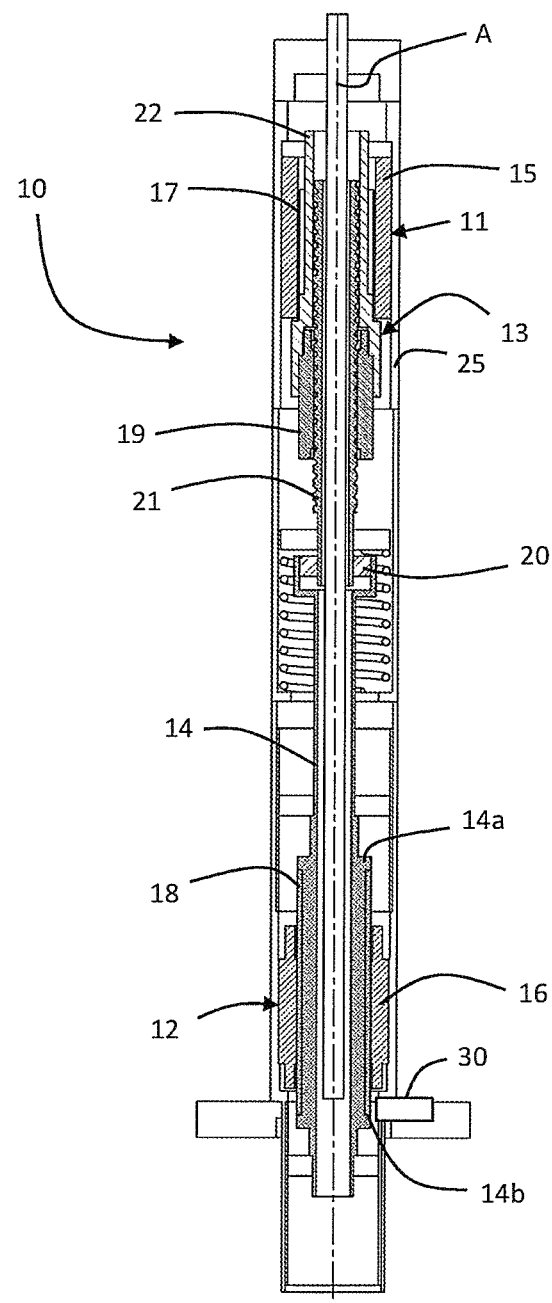
FIG. 1 is a sectional view of a first preferred embodiment of the rotary-linear actuation assembly according to the present invention, in a working configuration.

Referring to FIG. 1, there is shown a first preferred embodiment of a rotary-linear actuation assembly according to the present invention, generally indicated by reference numeral 10.

Rotary-linear actuation assembly 10 comprises a casing 25 inside which two actuators 11, 12 are housed, of which a first actuator, or linear actuator 11, is adapted to provide, at the output from actuation assembly 10, a translational movement along a main actuation axis A, and a second actuator, or rotary actuator 12, is adapted to provide, at its output, a rotary movement about actuation axis A.

Each actuator 11, 12 is an electromagnetic actuator and acts on a respective shaft 13, 14 arranged coaxial with actuation axis A. To this end, each actuator 11, 12 includes a respective electromagnetic stator 15, 16 integral with casing 25 and cooperating with a corresponding magnetic rotor 17, 18, integrally carried by the corresponding shaft 13, 14.

Shafts 13, 14 of the two actuators are arranged one above the other and are mutually connected through a rotation-decoupling joint 20. More particularly, lowermost shaft 14 is the output shaft of actuation assembly 10.

More particularly, shaft 13 of the first actuator 11, or first shaft 13, includes an outer tubular body 22, with axis parallel to actuation axis A, fixedly connected to a coaxial nut member 19 having an internal thread. The first shaft 13 further includes a recirculating ball screw 21 housed within outer tubular body 22 and coupled with nut member 19 in such a manner that a rotation of nut member 19 causes a translation of recirculating ball screw 21.

Recirculating ball screw 21 is connected at its bottom end to rotation-decoupling joint 20, which is to make rotation of the first shaft 13 independent of shaft 14 of the second actuator 12, or second shaft 14 or output shaft 14.

More specifically, decoupling joint 20 is adapted to allow a relative rotation between the second shaft 14 and recirculating ball screw 21 of the first shaft, and is moreover adapted to connect coaxial shafts 13, 14 so as to prevent a relative translation thereof. This is necessary in order to provide at the output the linear position control imposed by the first actuator 11.

The second shaft 14 is connected at its upper end to rotation-decoupling joint 20 and it has a first portion 14a on which magnetic rotor 18 coupled with electromagnetic stator 16 of the second actuator 12 is fixedly mounted. Magnetic rotor 18 has an axial size larger than the axial size of stator 15, so that stator 16 always at least partly faces rotor 18 independently of the axial position taken by the latter.

Figure 3:
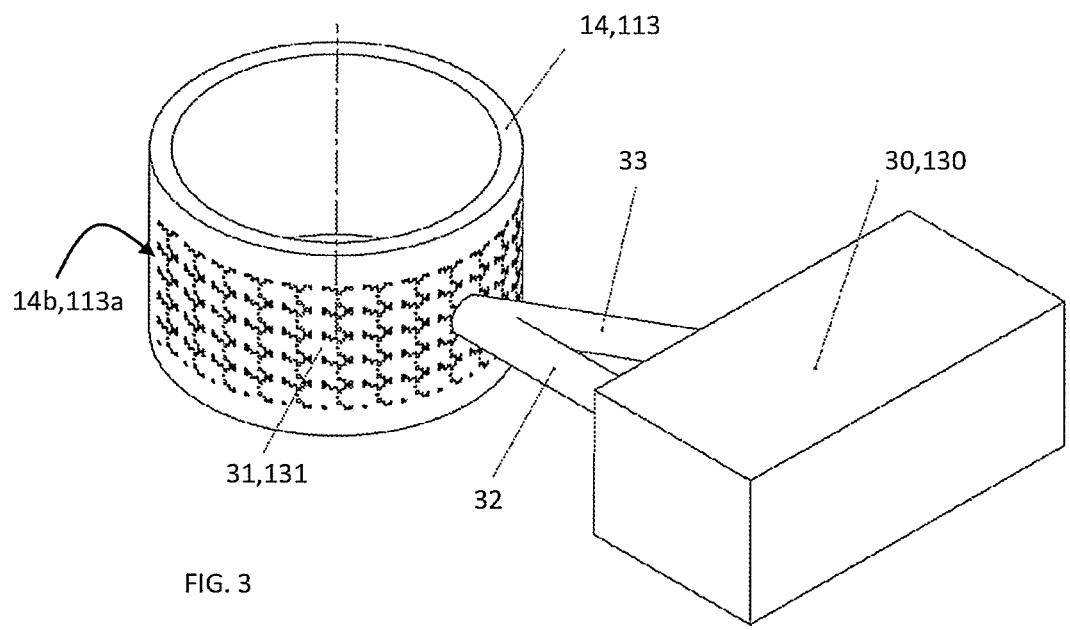
FIGS. 3 and 3a are schematic representations of a first position sensor employed in a rotary-linear actuation assembly according to the present invention and of an exemplary mark to be used with such a first position sensor, respectively.

According to the embodiment shown in FIG. 1, a mark 31, schematically shown in FIG. 3, is formed at least on a second portion 14b of the outer jacket surface of the second shaft 14. Such a mark extends all around shaft 14 and axially extends along shaft 14 over at least a length substantially corresponding to the maximum stroke shaft 14 can travel under the action imparted by the first actuator 11.

Moreover, a position sensor 30 is provided, which is arranged in a rotationally and translationally fixed manner relative to axis A in correspondence of shaft portion 14b bearing mark 31 and which faces the latter.

Referring in particular to the embodiment shown in FIG. 1, position sensor 30 is an optical sensor and is located directly below electromagnetic stator 16 of the second actuator 12.

Figures 2, 2A:
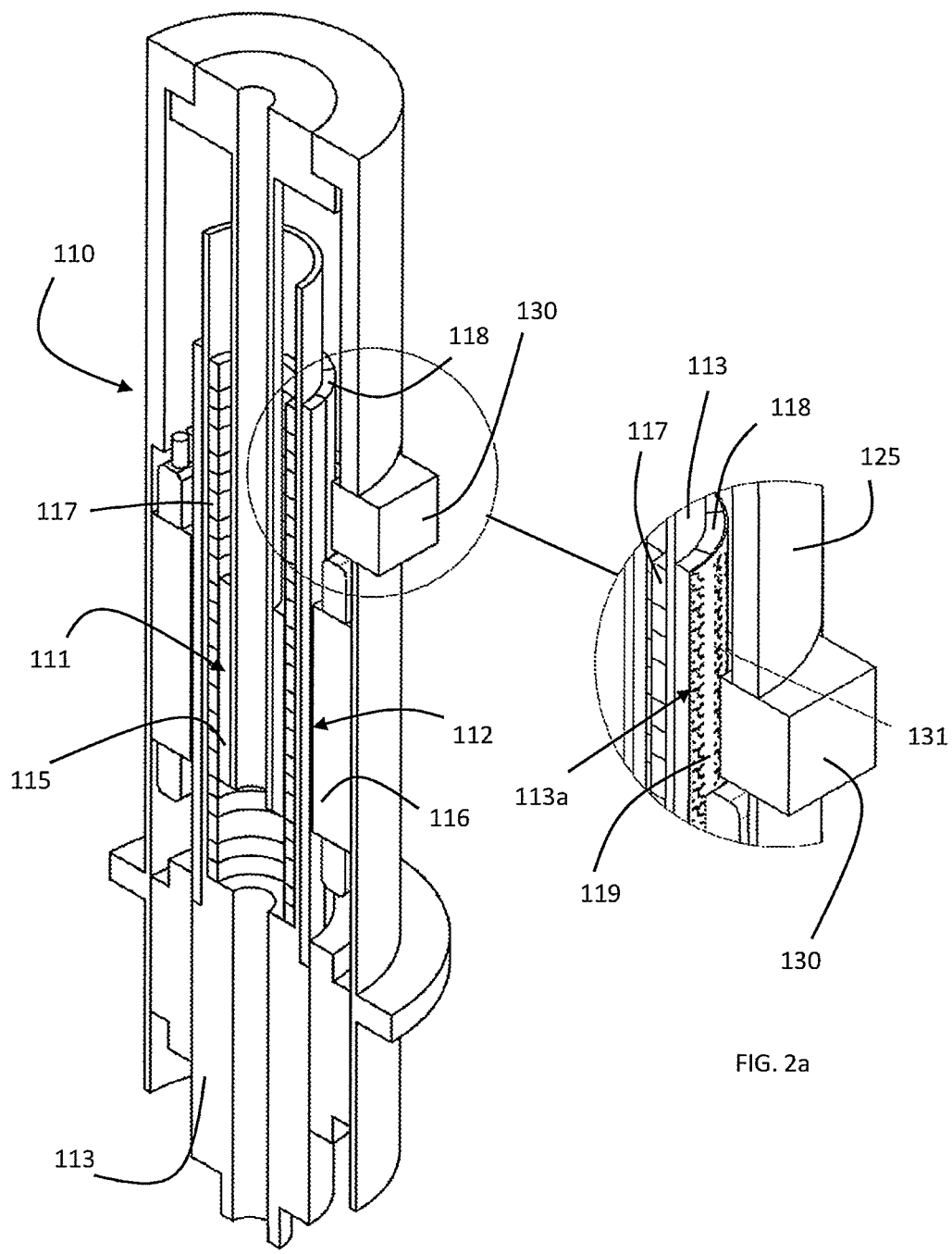
FIG. 2 is a sectional perspective view of a second preferred embodiment of the rotary-linear actuation assembly according to the present invention, in a working configuration.
FIG. 2a is an enlarged detail of FIG. 2.

In FIG. 2, there is shown a second preferred embodiment of a rotary-linear actuation assembly according to the present invention, generally indicated by reference numeral 110.

Rotary-linear actuation assembly 110 comprises a casing 125 inside which two actuators 111, 112 are housed, of which a first actuator, or linear actuator 111, is adapted to provide, at the output from actuation assembly 110, a translational movement along a main actuation axis A, and a second actuator, or rotary actuator 112, is adapted to provide, at its output, a rotary movement about actuation axis A.

Each actuator 111, 112 is an electromagnetic actuator and both of them act on a same shaft 113 coaxial with actuation axis A.

More particularly, linear actuator 111 is adapted to impart a translational displacement between a first end-of-stroke position, in which output shaft 113 is substantially wholly received within casing 125 or projects therefrom by a minimum length, and a second end-of-stroke position, or position of maximum projection of output shaft 113 from casing 125.

Each actuator 111, 112 includes a respective electromagnetic stator 115, 116 cooperating with a corresponding magnetic rotor 117, 118, both magnetic rotors 117, 118 being constrained to displace with output shaft 113. Moreover, actuators 111, 112 are coaxially and concentrically arranged.

According to the embodiment shown in FIG. 2, a mark 131, shown in detail in FIG. 2a, is formed on at least a portion 113a of the outer jacket surface of output shaft 113. Such a mark extends all around shaft 113 and axially extends along shaft 113 over at least a length corresponding to the maximum stroke the shaft can travel under the action imparted by linear actuator 111.

Specifically, in the embodiment shown in FIG. 2, mark 131 is formed on the jacket surface of radially outermost magnetic rotor 118 mounted on output shaft 113. More particularly, mark 131 is formed on a coating film 119 coating the outer surface of radially outermost magnetic rotor 118.

Moreover, a position sensor 130 is provided, which is arranged in stationary manner in correspondence of portion 113a of output shaft 113 bearing mark 131 and which faces the latter. Referring in particular to the embodiment shown in FIG. 2, position sensor 130 is an optical sensor and is located directly above outermost electromagnetic stator 116.

According to alternative embodiments (not shown), the position sensor is a magnetic sensor and the second portion 14b, 113a of the outer surface of output shaft 14, 113 on which mark 31, 131 is formed does not overlap magnetic rotor 118, 118, but it is confined above or below the same. Also in this case position sensor 30, 130 is located so as to at least partly face such a portion bearing mark 31, 131.

In the schematic representation shown in FIG. 3, position sensor 30, 130 is an optical sensor and comprises a laser source emitting a light beam 32 impinging on shaft portion 14b, 113a bearing mark 31, 131, and a photodetector, e.g. a CCD or a CMOS, towards which return beam 33 is reflected.

Figure 3A:
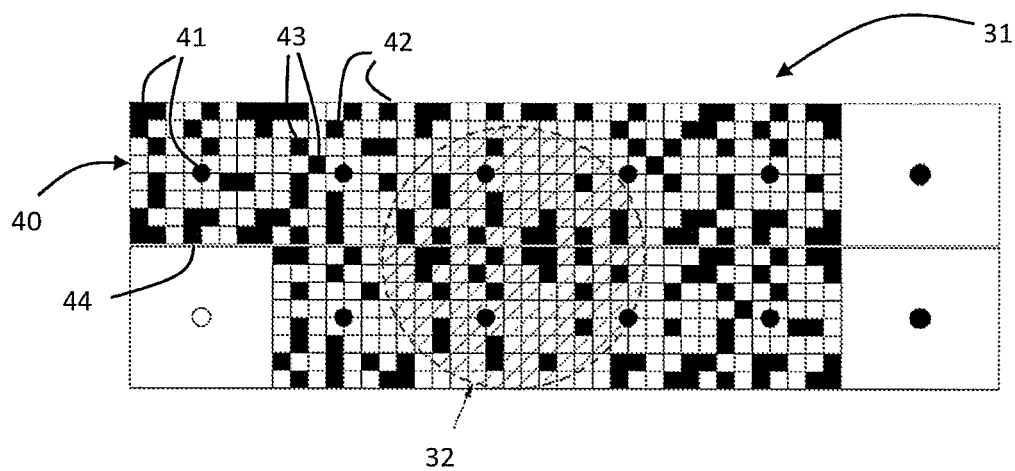

As shown in FIG. 3a, mark 31, 131 preferably comprises a plurality of areas 40, and each area 40 comprises invariable markers 41 defining the contour and/or the centre thereof and acting as references.

Each area 40 further comprises first variable markers 42 adapted to indicate the angular position of the area, and second variable markers 43 adapted to indicate the longitudinal position of area 40, besides possible additional markers 44 adapted to provide a code for error check and correction of the content of each area 40. Markers 41 to 44 can be identified in a set of subareas, the whole of the subareas of all markers relevant to a specific area 40 forming the area itself.

According to the alternative embodiment shown in FIG. 4, outer surface portion 14b, 113a of output shaft 14, 113 bearing mark 31, 131 is a head portion of output shaft 14, 113, and position sensor 30, 130 is mounted in rotationally and translationally fixed manner relative to axis A so as to at least partly face outer surface portion 14b, 113a bearing mark 31, 131.

FIG. 4a shows, by way of example, an area 40 of a mark 31, 131 borne by the head portion of output shaft 14, 113. Such an area 40 comprises invariable markers 41 acting as references and variable markers 42 adapted to indicate the angular position of the area. Moreover, additional markers 44 are provided, which are adapted to provide a check code for each area 40.

The operation of rotary-linear actuation assembly 10, 110 according to the invention is as follows.

When actuation assembly 10, 110 is operated, output shaft 14, 113 is made to rotate and/or translate depending on the commands given to actuators 11, 12, 111, 112. Consequently, also mark 31, 131 is made to rotate and/or translate, thereby causing a specific area 40 of the mark, or at least a substantial portion of area 40, to face position sensor 30, 130.

Position sensor 30, 130 thus detects markers 41-44 present in the area facing at that moment sensor 30, 130, thereby recognising references 41 of area 40 detected and, based on such references, detecting and recognising variable markers 42, 43 carrying the information about the instant angular and/or longitudinal position of output shaft 14, 113.

In case of an optical sensor 30, 130, the laser source emits a laser light beam impinging on surface portion 14b, 113a bearing mark 31, 131 faced at that moment by the optical sensor. Emitted beam 32 is differently reflected depending on the kind of subarea it meets. For instance, the mark may be formed of alternating glossy and opaque subareas. In this case, laser light beam 32 is reflected or at least partly absorbed, thereby generating a phase variation and a time delay in return beam 33 depending on the finish (glossy or opaque) of the surface portion it impinges on.

Moreover, by taking as reference an invariable marker 41, for instance the marker of the centre of area 40 of mark 31 the optical sensor is facing at that moment, and by comparing two consecutive acquisitions, the photodetector is capable of detecting the displacement of such a marker, and thus of output shaft 14, 113, with extreme precision.

For instance, in case of a CMOS or CCD photodetector, the horizontal and vertical pixels separating the two consecutive measurements corresponding to the specific invariable marker 41 are measured, each pixel corresponding to displacements of the order of the tenths of micron. In this manner, depending on the time elapsed between two consecutive acquisitions, it is also possible to compute the velocity and the acceleration of output shaft 14, 113.

In case of a mark 31, 131 formed on a head portion of output shaft 14, 113, variable markers 42 could even contain only the information about the angular position, since the longitudinal position may be obtained from the return time of the reflected beam, which is proportional to the distance between the head surface bearing mark 31, 131 and the laser source.

In case of use of a magnetic sensor 130, mark 131 comprises a plurality of magnetic tracks and sensor 130 comprises an array of magnetic micro-sensors and is adapted to electrically reproduce the magnetic signals arriving at that array.

The features of the rotary-linear actuation assembly according to the present invention are clearly apparent from the above description, as are clearly apparent the relevant advantages.

Further variants of the embodiments described above are possible without departing from the teaching of the invention.

Lastly, it is clear that a rotary-linear actuation assembly as conceived can undergo several changes and modifications, all included in the invention. Moreover, all details can be replaced by technically equivalent elements. In practice, any material as well as any size can be used, depending on the technical requirements.

The invention claimed is:

1. A rotary-linear actuation assembly (10, 110) comprising a casing (25, 125) with which there are associated:
    an output shaft (14, 113) arranged coaxial with an actuation axis (A) in a translationally and rotationally movable manner;
    at least two actuators, of which a first actuator (11, 111) is adapted to impart a translational movement along the actuation axis (A) on the output shaft (14, 113) and a second actuator (12, 112) is adapted to impart a rotary movement around the actuation axis (A) on the output shaft (14, 113); and
    at least one position sensor (30, 130) adapted to detect an instant position of the output shaft (14, 113) inside the casing (25, 125);
    wherein said at least one position sensor (30, 130) is mounted in a rotationally fixed manner about the actuation axis (A) and in a translationally fixed manner along the actuation axis (A), and faces at least a portion (14b, 113a) of the output shaft (14, 113),
    wherein the at least a portion (14b, 113a) of the output shaft (14, 113) bears, on an outer surface thereof, a two-dimensional mark (31, 131) that extends over at least an angular portion around the output shaft (14, 113) and at least an axial section along an axial extension of the output shaft (14, 113),
    wherein said at least one position sensor (30, 130) includes a single stationary sensor that detects both an instant axial position and an instant angular position of the output shaft,
    wherein the stationary sensor is an optical sensor and comprises a laser source emitting a light beam (32) aligned to impinge on the at least a portion (14b, 113a) of the output shaft that bears the two-dimensional mark (31, 131), and a photodetector toward which a return beam (33) is reflected, and
    wherein the two-dimensional mark (31, 131) comprises a plurality of areas (40), and each of the areas (40) comprises invariable markers (41) defining at least one of the contour and center thereof and acting as references.

2. The rotary-linear actuation assembly (10, 110) according to claim 1, wherein the two-dimensional mark (31, 131) extends substantially all around the output shaft (14, 113).

3. The rotary-linear actuation assembly (10, 110) according to claim 1, wherein the two-dimensional mark (31, 131) axially extends along the output shaft (14, 113) over at least a length substantially corresponding to a maximum stroke travelled by the output shaft (14, 113) under action imparted by the first actuator (11, 111).

4. The rotary-linear actuation assembly (10, 110) according to claim 1, wherein the outer surface of the at least a portion (14b, 113a) of the output shaft (14, 113) bearing the two-dimensional mark (31, 131) is a head surface of the output shaft (14, 113).

5. The rotary-linear actuation assembly (10, 110) according to claim 1, wherein the two-dimensional mark (31) comprises a plurality of markers (42, 43, 44) variable along at least one of an angular extension and the axial extension of the at least a portion (14b, 113a) of the output shaft (14, 113) bearing the two-dimensional mark (31).

6. The rotary-linear actuation assembly (10, 110) according to claim 5, wherein the invariable markers (41) and the plurality of markers (42, 43, 44) comprise a plurality of subareas of the outer surface of the at least a portion (14b, 113a) of the output shaft (14, 113) having respectively different opacity degrees.

7. The rotary-linear actuation assembly (10, 110) according to claim 6, wherein the photodetector includes a CCD or a CMOS.

8. The rotary-linear actuation assembly (10, 110) according to claim 5, wherein the invariable markers (41) and the plurality of markers (42, 43, 44) comprise a plurality of magnetic tracks obtained on the outer surface of the at least a portion (14b, 113a) of the output shaft (14, 113) and the at least one position sensor (30) comprises an array of magnetic sensors.

9. The rotary-linear actuation assembly (10, 110) according to claim 1, wherein the first (111) and the second (112) actuators are arranged in a mutually coaxial and concentric manner, the two-dimensional mark (131) being obtained on at least a portion of a jacket surface of a magnetic rotor (118) mounted on the output shaft (113) associated with a radially outermost actuator (112) out of the first actuator (111) and the second actuator (112).

10. The rotary-linear actuation assembly (10, 110) according to claim 1, wherein a jacket surface of the at least a portion (14b, 113a) of the output shaft (14, 113) is coated with a coating film (119), the two-dimensional mark (31) being obtained on such a coating film (119).

11. The rotary-linear actuation assembly (10, 110) according to claim 1, wherein the stationary sensor is fixedly mounted in proximity of an electromagnetic stator (16, 116) associated with a radially outermost actuator (112) out of the first actuator (111) and the second actuator (112).

12. The rotary-linear actuation assembly (10, 110) according to claim 1, wherein each of the areas (40) further comprises first variable markers (42) adapted to indicate the angular position of the area, second variable markers (43) adapted to indicate a longitudinal position of the area, and additional markers (44) adapted to provide a code for error check and correction of a content of the area.

13. The rotary-linear actuation assembly (10, 110) according to claim 12, wherein said markers (41, 42, 43, 44) can be identified in a set of subareas, the whole of the subareas of all markers relevant to a specific area (40) forming the area itself.

* * * * *